US008683463B2

(12) United States Patent
Sato et al.

(10) Patent No.: US 8,683,463 B2
(45) Date of Patent: *Mar. 25, 2014

(54) PORTABLE TERMINAL DEVICE AND RECEPTION METHOD FOR SIMULTANEOUSLY DISPLAYING APPLICATIONS

(75) Inventors: Shunta Sato, Tokyo (JP); Takahisa Someya, Kanagawa (JP); Atsushi Imai, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 150 days.

This patent is subject to a terminal disclaimer.

(21) Appl. No.: 12/856,303

(22) Filed: Aug. 13, 2010

(65) Prior Publication Data
US 2010/0306758 A1 Dec. 2, 2010

Related U.S. Application Data

(62) Division of application No. 11/246,201, filed on Oct. 11, 2005, now Pat. No. 7,802,244.

(30) Foreign Application Priority Data

Oct. 14, 2004 (JP) .................................. 2004-300485

(51) Int. Cl.
G06F 9/44 (2006.01)
H04M 3/00 (2006.01)
(52) U.S. Cl.
USPC ........... 717/176; 717/168; 717/171; 455/418; 455/419
(58) Field of Classification Search
USPC .................. 717/168–178; 455/418, 419, 466
See application file for complete search history.

(56) References Cited

U.S. PATENT DOCUMENTS 6,163,683 A * 12/2000 Dunn et al. ................. 455/151.1
6,253,188 B1 * 6/2001 Witek et al. ................ 705/14.54
(Continued)

FOREIGN PATENT DOCUMENTS

WO WO03/084098 * 10/2003 ............... H04B 7/26
WO WO 03/084098 A1 10/2003

OTHER PUBLICATIONS

Coninx et al., Dygimes: Dynamically Generating Interfaces for Mobile Computing Devices and Embedded Systems, Springer-Verlag Berlin Heidelberg 2003, pp. 257-278.*

(Continued)

Primary Examiner — Satish Rampuria
(74) Attorney, Agent, or Firm — Oblon, Spivak, McClelland, Maier & Neustadt, L.L.P.

(57) ABSTRACT

When data received separately in first and second reception processing is processed separately by first and second application programs, and when data received by the first reception processing contains specific data specifying processing by the second application program, and the specific data has regional properties, the current region where the second application program is executed is judged, and if the region does not match a region to which processing specified by the specific data belongs, the content specified by the specific data is converted based on data in a predetermined table, and processing is executed by the second application program. Accordingly, two application programs can be linked in a mobile phone unit or other terminal devices, and problems when executing one application with regional properties under control of the other application can be resolved.

13 Claims, 5 Drawing Sheets

(56) References Cited

U.S. PATENT DOCUMENTS

| | | | |
|---|---|---|---|
| 6,654,034 B1 | 11/2003 | Kanevsky et al. | |
| 6,957,064 B2* | 10/2005 | Iyer et al. | 455/418 |
| 7,327,719 B2 | 2/2008 | Hardisty | |
| 2002/0052198 A1* | 5/2002 | Savilaakso | 455/422 |
| 2004/0242203 A1* | 12/2004 | Lipsanen et al. | 455/412.1 |
| 2007/0033584 A1* | 2/2007 | Yu | 717/168 |
| 2009/0036108 A1* | 2/2009 | Cho | 455/418 |

OTHER PUBLICATIONS

Myles et al., Preserving Privacy in Environments with Location-Based Applications, IEEE, 2003, pp. 56-64.*

Jin Teong Ong; Siew, C.K., Specifications and measurements of service areas coverage for mobile radio systems, IEEE, Oct. 1993, vol. 3, pp. 135-138.

Hsiao-Kuang Wu; Ming-Hui Jin; Jorng-Tzong Horng; Chen-Yi Ke, Personal paging area design based on mobile's moving behaviors, IEEE, 2001, vol. 1, pp. 21-30.

Ying-Hong Wang; Huan-Chao Keh; Tsang-Ching Hu; Cheng-Horng Liao, A hierarchical dynamic monitoring mechanism for mobile agent location, IEEE, Mar. 2005, vol. 1, pp. 351-356.

Patent Abstracts of Japan, JP 2004-104482, Apr. 2, 2004.

Patent Abstracts of Japan, JP 2004-166078, Jun. 10, 2004.

Multimedia wireless interactive and collaborative telecom services, Choukair, Z.; Takizawa, M., IEEE, 2004, pp. 1-6.

Barcode readers using the camera device in mobile phones, Ohbuchi, E.; Hanaizumi, H.; Hock, L.A., IEEE, 2004, pp. 1-6.

A Java-based visual mining infrastructure and applications, Hao, M.C.; Dayal, U.; Hsu, M.; Baker, J.; D'Eletto, R.; IEEE, 1999, pp. 124-127.

Enabling video processing in wireless terminals with a new open multimedia application platform, Chaoui, J.; Giacalone, J.-P.; De Gregorio, S.; IEEE, 2000, pp. 394-395.

A remote display environment: an integration of mobile and ubiquitous computing environments, Uemukai, T.; Hara, T.; Tsukamoto, M.; Nishio, S.; IEEE, vol. 2, 2002, pp. 618-624.

An e-mail connectivity solution for WAP-enabled mobile phone, Milasinovic, B.; Fertalj, K.; IEEE, 2003, pp. 587-592.

* cited by examiner

101

| Station Name | Region | System | Channel |
|---|---|---|---|
| XXX TV | Sapporo | System A | 3 |
| YYY TV | Sapporo | System B | 1 |
| ZZZ TV | Sapporo | System C | 4 |
| ⋮ | ⋮ | ⋮ | ⋮ |

PORTABLE TERMINAL DEVICE AND RECEPTION METHOD FOR SIMULTANEOUSLY DISPLAYING APPLICATIONS

CROSS REFERENCES TO RELATED APPLICATIONS

This application is a divisional Application of, and claims the benefit of priority under 35 U.S.C. §120 from, U.S. application Ser. No. 11/246,201, filed Oct. 11, 2005, which claims the benefit of priority under 35 U.S.C. §119 from Japanese Patent Application JP 2004-300485, filed in the Japanese Patent Office on Oct. 14, 2004. The entire contents of each of the above applications are incorporated herein by reference.

BACKGROUND OF THE INVENTION

1. Field of the Invention

This invention relates to a portable terminal device such as a mobile phone unit and to a reception method used by such a portable terminal, and in particular relates to technology to display content on a portable terminal device.

2. Description of the Related Art

The spread of mobile phone units and other portable terminals in recent years has been accompanied by commercialization of mobile phone units which, in addition to typical transmission and reception functions for conversation as well as e-mail transmission/reception functions and Internet connection functions, also incorporate such varied functions as television (hereafter "TV") reception functions, video game functions, and camera functions. In the case of a unit incorporating TV reception functions, a tuner for broadcast reception is built-in.

The various above-described functions are obtained through control and processing based on application programs (hereafter "applications") stored in internal memory of the mobile phone unit in advance. Applications have their own unique functions, and may be used either independently or in concert with other applications. For example, in addition to conversation processing in use as a telephone set, games may be displayed onscreen, the unit may be used as a camera, music may be output, and various other processing may be performed. For example, in the case of applications related to display, an application may be read from memory corresponding to an instruction input by user operation of a select/execute button or the like on the mobile phone unit; the application is interpreted and executed by the CPU (Central Processing Unit) which controls the various devices incorporated into the unit, causing content to be displayed in the display portion of the unit.

When an application related to display is executed in a mobile phone unit, there are cases in which two applications are executed simultaneously, and displays based on the two applications are displayed simultaneously. As an example of simultaneous displays based on two applications, for example, a Web browser and mailer may be started. A Web browser is an application which connects to the Internet and causes the contents of a web page or the like to be displayed. A Web browser may be used to specify a particular URL (Uniform Resource Locator); or, by using a search engine or the like, the contents of a object resource may be found through the Internet connection. Also, a mailer is an application to send and receive e-mail. By using a mailer, a sender and a receiver can specify each other's mail address to send and receive e-mail.

Upon simultaneously starting these two applications, and simultaneously causing the contents of each to be displayed on a single screen, for example, the Web browser can be used to enjoy the Internet connection while viewing e-mail displayed within the mailer.

Patent Reference 1 discloses a mobile phone unit which uses two types of display screens, which are a main display portion and a secondary display portion, and which can simultaneously process a plurality of applications and cause application content to be displayed on the different display screens.

Patent Reference 1: Published Japanese Patent Application No. 2003-204378 (FIG. 2)

SUMMARY OF THE INVENTION

However, when two applications are started simultaneously and made to display content, settings related to the display of one application may be made based on processing by the other application. For example, in a mobile phone unit incorporating a tuner for TV broadcast reception, when an application to send and receive e-mail is started, in the processing of the started applications, it may occur that e-mail is received containing a list of recommended TV broadcast programs and link information to the channels of the stations broadcasting the recommended programs.

When causing mail text and images of the received e-mail to be displayed by the mobile phone unit, by performing an operation to select the link location to the channel of a station broadcasting a recommended program in the displayed mail text, for example, an application in the mobile phone unit to receive TV broadcasts may be started, and the channel broadcasting from the specified station is received, with the received images displayed in the display portion, and received audio output from a speaker.

Thus there are cases in which, based on an instruction in one application, processing in another application may be linked and executed. However, depending on the current location of the user in possession of the mobile phone unit, cases are conceivable in which accommodation of the link in the e-mail is not possible.

Specifically, when for example there is link data in a received e-mail to the station of a TV broadcast program broadcast in Hokkaido, if the user who has received the mail is in a region other than Hokkaido, the link data is meaningless. Even if there is automatic reception of a specific channel based on link data, there is a strong possibility that the station broadcasting using the channel number is a different station, and so the link function is not valid.

Here, a case is explained in which two applications, which are an e-mail function and a TV broadcast reception function, operate in concert; but when two other applications operate in concert also, a similar problem arises when execution of one of the applications is limited by region.

This invention was devised in light of such circumstances, and is to provide the resolution of problems in cases in which two applications operate in concert, with one application used to execute another application having regional properties.

An embodiment of the present invention is a portable terminal device and reception method thereof in which, when performing first reception processing to receive data based on a first application program, second reception processing to receive data based on a second application program, and application program execution processing by the first and second application programs, and when specific data specifying processing by the second application program is included in data received by the first reception processing and the specific data has regional properties, the application program execution processing is performed such that the current region in which the second application program is executed is judged, and when the current region does not match a region of processing specified by the specific data, content indicated by the specific data is converted based on predetermined table data, and the processing of the second application program is executed.

By this means, when data specified by processing of the first application program has regional properties, and the current region does not match a region of processing specified by the data, data conversion is performed, so that processing in which regional properties match can be performed by the second application program.

According to the embodiment of the present invention, two application programs can be operated in concert, and when processing having regional properties is specified for one of the application programs based on the other application program, if the current region does not match the regional properties, the contents specifying processing having regional properties are converted; hence when executing processing having regional properties, processing corresponding to the current location at that time can be performed, and processing in accordance with the region becomes possible regardless of the current location.

In this case, the first reception processing is processing to receive data via a wireless telephone line; the second reception processing is processing to receive broadcast content; and by performing processing to convert the reception channel or reception frequency for the second reception processing, which is specified by data received by the first reception processing, into another reception channel or reception frequency, cases in which the channel or frequency of broadcast of a program differs among regions can be accommodated.

Further, when performing conversion of the reception channel or reception frequency, by making the table to perform conversions of reception channels or reception frequencies based on electronic program guide information contained in broadcast data received in the second reception processing, broadcast channels or frequencies for different regions can be judged simply from the electronic program guide information.

DESCRIPTION OF THE PREFERRED EMBODIMENTS

Hereinafter, an embodiment of the present invention is explained referring to the attached drawings. This embodiment is an example of application to a portable terminal device which, in addition to conversation send/receive functions, e-mail functions, Internet connection functions and similar, is provided with functions for reception of TV broadcasts. Here, an example is explained of application to a digital cellular-type mobile phone unit as the portable terminal device.

Figure 1:
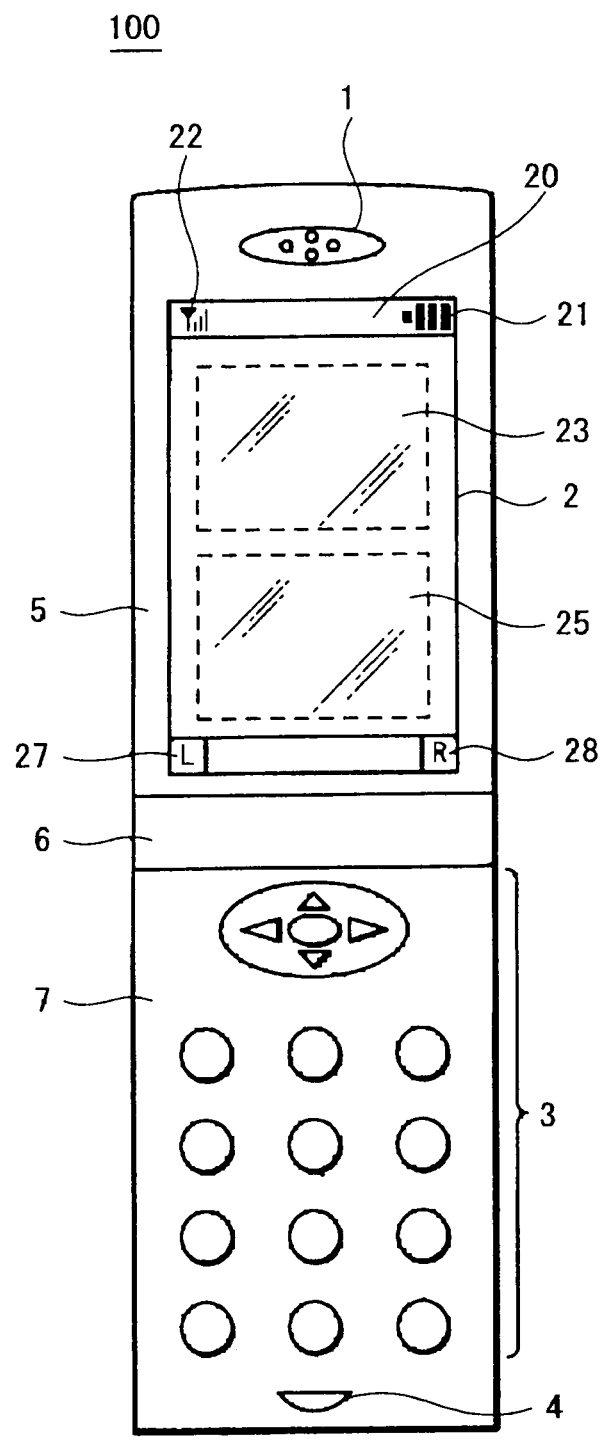
FIG. 1 is a plan view showing an example of the external shape of a mobile phone unit according to an embodiment of the invention.

First, an example is explained of the external shape of the mobile phone unit of this example. FIG. 1 shows an example of the external shape of a mobile phone unit 100 of this example. The mobile phone unit 100 is configured to have an upper housing and lower housing 7, connected by a hinge portion 6 as a support point and to be capable of being folded. FIG. 1 shows the opened state. In FIG. 1, the inner-side surfaces which are opposed when the telephone is folded are shown.

In the upper housing 5 are positioned a speaker 1 for audio output of the voice of the remote communication partner during conversation and of call-received ringtones and similar, as well as a display portion 2 which uses a liquid crystal display panel or the like to display characters and numbers, symbols, icons, cursors, still images, video, and similar. In the mobile phone unit 100 of this example, the display portion 2 is divided into two portions of arbitrary size, and it is possible to display different content in the two display screens (multi-window display). In the lower housing 7 are provided a key operation portion 3 as input means, in which are placed dial keys for the numbers 1, 2, . . . , 9, 0 as well as the "#" and "*" symbols, various function keys, a direction-specifying key to manipulate a cursor or the like, and an enter key or the like to confirm operations, as well as a microphone 4 for audio input. As the direction-specifying key and enter key, a jog-dial key may be used, which can be operated rotationally and by pressing down.

In the upper part of the display portion 2 is a pictograph display area 20, which displays various state icons for the mobile phone unit 100, and in this pictograph display area 20 is reserved an area for display of a battery icon 21 indicating the remaining amount of battery power and an antenna icon 22 indicating the radio wave reception level. In this example, the display portion 2 of the mobile phone unit 100 is configured with two screens, above and below, to separately display images for different applications. Specifically, as shown in FIG. 1, images for each of the different applications can be displayed in the first display area 23 and second display area 25, resulting from the division into two portions, upper and lower, of the display area of the display portion 2. Details of the display states in each of the display areas 23 and 25 are explained below. In the lower part of the display portion 2 are a left-operation icon 27 for left operation and a right-operation icon 28 for right operation, which can be used to specify content, make onscreen movements, and similar.

In this example, a foldable-type mobile phone unit is used in explanations; but a straight-type terminal, revolver-type terminal, or various other shape configurations may be used.

Figure 2:
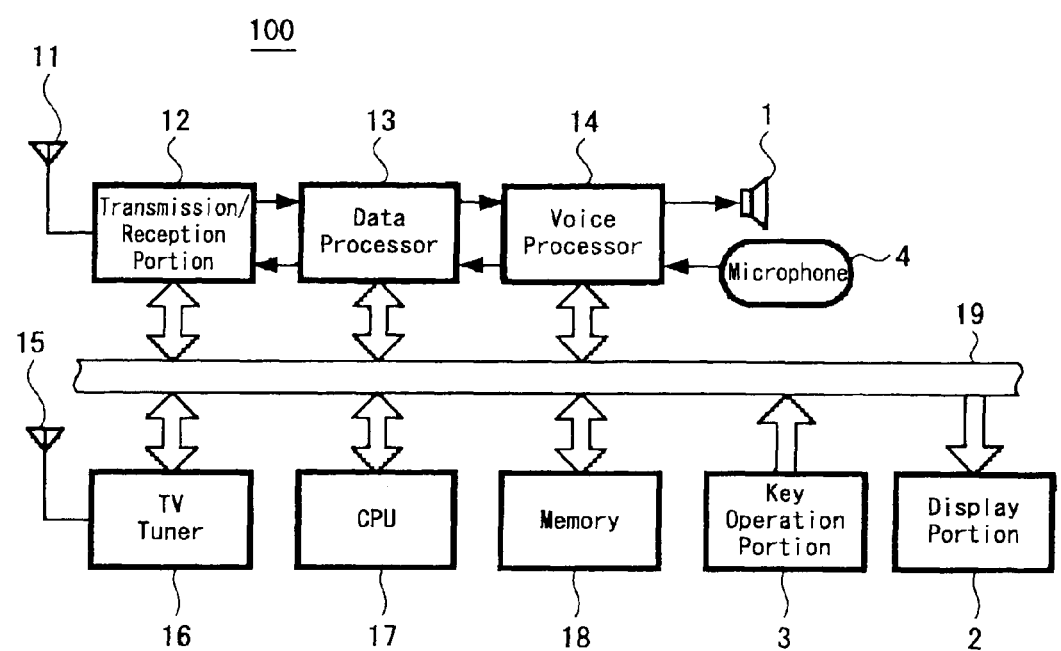
FIG. 2 is a block diagram showing an example of the internal configuration of a mobile phone unit according to an embodiment of the invention.

Next, an example of the internal configuration of the mobile phone unit 100 is explained referring to the block diagram of FIG. 2.

First, the reception system during voice conversation of the mobile phone unit 100 is explained. An antenna 11 is connected to a transmission/reception portion 12, and receives signals transmitted by a predetermined communication method from an external remote station, not shown in the figure, at the transmission/reception portion 12. As the wireless communication method used by the transmission/reception portion 12 for transmission and reception, for example, CDMA (Code Division Multiple Access) is used.

Reception signals received and demodulated by the transmission/reception portion 12 are supplied to a data processor 13, and a reception packet is extracted; from the packet are retrieved the voice data, control data, and other necessary data. The retrieved voice data is supplied to a voice processor 14, converted from digital data into analog voice signals, subjected to amplification and other voice processing, and supplied to the speaker 1, to output the voice of the remote communication partner.

The transmission system during voice conversation is explained below. Voice signals supplied from the microphone 4 are converted into digital voice data in the voice processor 14, the converted voice data is supplied to the data processor 13, and the voice data is arranged in the transmission packet. Control data and other data are also arranged within the transmission packet. The transmission packet generated in the data processor 13 is supplied to the transmission/reception portion 12, and after predetermined modulation processing has been performed, frequency-conversion into transmission signals at a predetermined transmission frequency is performed, and the frequency-converted transmission signals are transmitted wirelessly from the antenna 11. Those reception processing and transmission processing are executed under the control of the CPU (Central Processing Unit) 17 of the terminal 100, and any necessary information is displayed on the display portion 2. Programs required for control by the CPU 17 are stored in a memory 18.

When performing data reception and data transmission in the mobile phone unit 100 of this example in order to send and receive e-mail, to access the Internet or the like, the necessary data is extracted from received packets and the necessary data is arranged into transmission packets in the data processor 13 under control by the CPU 17. Processing of received data and processing of data for transmission are performed through execution by the CPU 17 of applications with various functions, stored in memory 18.

For example, when sending and receiving e-mail, e-mail data reception or transmission is performed under control by the CPU 17, and display of received e-mail data by the display portion 2, as well as input processing of e-mail for transmission by the key operation portion 3, are performed through execution by the CPU 17 of an e-mail application stored in memory 18. When accessing the Internet using a web browser also, a web browser application stored in memory 18 is executed by the CPU 17, and downloaded images and the like are displayed on the display portion 2. Control and other data are exchanged between the CPU 17 and other portions via a system bus 19.

Next, functions to receive TV broadcasts, incorporated into the mobile phone unit 100 of this example, are explained. The terminal 100 is provided with a TV antenna 15, either externally or internally, as well as a TV tuner 16 connected to the TV antenna 15. The TV tuner 16 of this example is configured as a TV tuner capable of receiving ground-wave digital broadcast signals. Reception processing by the TV tuner 16 is executed under control of the CPU 17, and image signals obtained from the received broadcast signals are displayed on the display portion 2, while audio signals obtained from the received broadcast signals are output from the speaker 1 (or from an earphone, not shown).

In the TV tuner 16, in addition to reception of the image signals and audio signals which are the main content data of a TV broadcast, various other accompanying data is also received. For example, EPG (Electronic Program Guide) data, used to display program tables and similar, is also received. Processing to display a program table or the like based on received EPG data is performed through execution by the CPU 17 of an application for TV broadcast reception, stored in memory 18. EPG data received in a digital broadcast includes not only data for display of program tables for various channels, but data relating to the stations for each channel. Data relating to a station may be, for example, data relating to the system (broadcast network with which a station is affiliated) to which the station belongs. In this example, when EPG data is received, data relating to the systems to which stations included in EPG data belong is stored as a table in memory 18. The state of storage in memory 18 is explained below.

The mobile phone unit 100 of this example is designed to be capable of simultaneous execution of at least two among a plurality of applications, under control of the CPU 17. That is, of the plurality of applications stored in memory 18, the CPU 17 can simultaneously execute at least two applications selected by key operations by the user or by other means, and data can be displayed simultaneously based on processing by each. For example, an e-mail application and a TV broadcast reception application can be simultaneously processed, with received e-mail displayed in the display area 25 of the display portion 2 (FIG. 1), and received TV broadcast programs displayed in the display area 23 of the display portion 2 (FIG. 1). Or, an application for connection to the Internet and a TV broadcast reception application can be processed simultaneously, with content displayed separately in the display areas 23 and 25.

Further, when simultaneously starting two applications, processing by one application may be linked with processing by the other application. For example, when link data specifying a program (content) broadcast by a specific station is contained in e-mail received by an e-mail application, if the user performs an operation to select the location displayed by the mail text corresponding to the link data, the CPU 17 starts an application to receive TV broadcasts, causes the channel over which the program is broadcast to be received by the TV tuner 16, and displays the images and outputs the audio received. The CPU 17 judges the correspondence between the link data and the actually received channel by referring to the received EPG data.

However, when broadcasts by a station broadcasting a program specified by link data in a received e-mail cannot be received by the mobile phone unit 100 at its current position, the reception channel specified by the link data is converted into another channel reception of which is possible at the current position. At the time of this conversion, the received EPG data is referenced to specify the conversion channel. That is, based on the EPG data received by the TV tuner 16, the CPU 17 forms a list (table) of stations which can be received in the region, and stores this list in memory 18. The data in this table is referenced, and when a station exists which broadcasts the specified program (that is, when the region of broadcast of a program specified by link data matches the region of a station which can be received at the current position), this station is received. When the station broadcasting the specified program does not exist among the stations in the table which can be received (that is, when the region of broadcast of the program specified by the link data does not match the regions of stations which can be received at the current position), the station most suitable for reception is selected from the data in the table. When selecting the station most suitable for reception, a station is selected for which systems match among the station appended to the link data and a station indicated by data in the table.

Figures 4, 5:
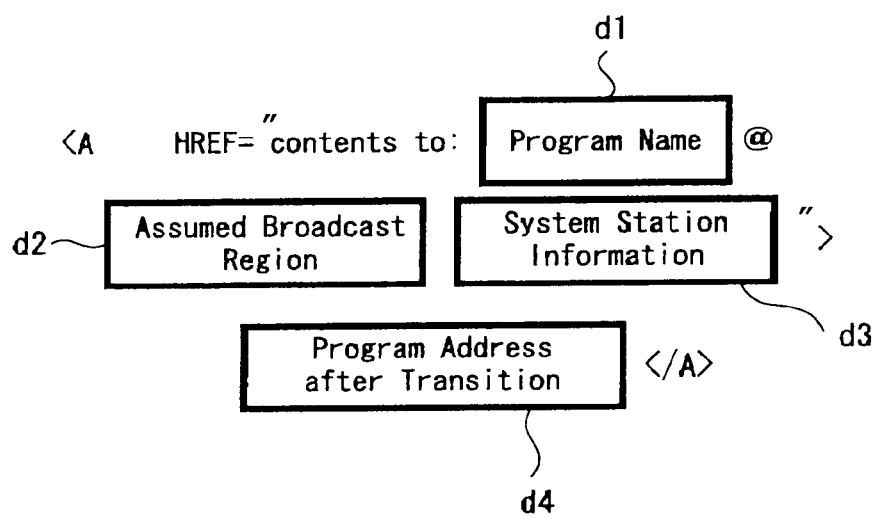
FIG. 4 is an explanatory drawing showing an example of the configuration of a TV channel table according to an embodiment of the invention.
FIG. 5 is an explanatory drawing showing an example of description of a channel switching source according to an embodiment the invention.

FIG. 4 shows an example of a case in which EPG data is received under control of the CPU 17, and a list of stations which can be received in the region is formed as a TV channel table. As indicated in FIG. 4, the EPG data includes the names of stations which can be received in the region, the names of regions in which the stations can be received, data relating to system stations with which a station is affiliated, and data relating to the channel numbers of stations; this data is stored as a table. When there is a change to this data, which is contained in EPG data received by the TV tuner 16 (for example, when the position of the terminal 100 changes, and the stations which can be received change), the data stored in the table is updated. The table may be always stored in memory 18, or the table may be stored only while EPG data received from TV broadcasts by the tuner 16 can be obtained, based on the received data.

Next, an example of processing when two different applications in the mobile phone unit 100 of this example are started simultaneously is explained. In this example, an application to process e-mail and an application to receive a TV broadcast are started simultaneously. Specifically, an application to cause display of received e-mail is for example started, and with received mail text displayed in the second display area 25 of the display portion 2, if the user operates the key operation portion 3 to select the location at which program link data in the mail text is displayed, then processing by the application to receive TV broadcasts causes the TV tuner 16 to receive the channel on which the program is broadcast, and processing is performed to display received images in the first display area 23 of the display portion 2 and to output received audio.

Figure 3:
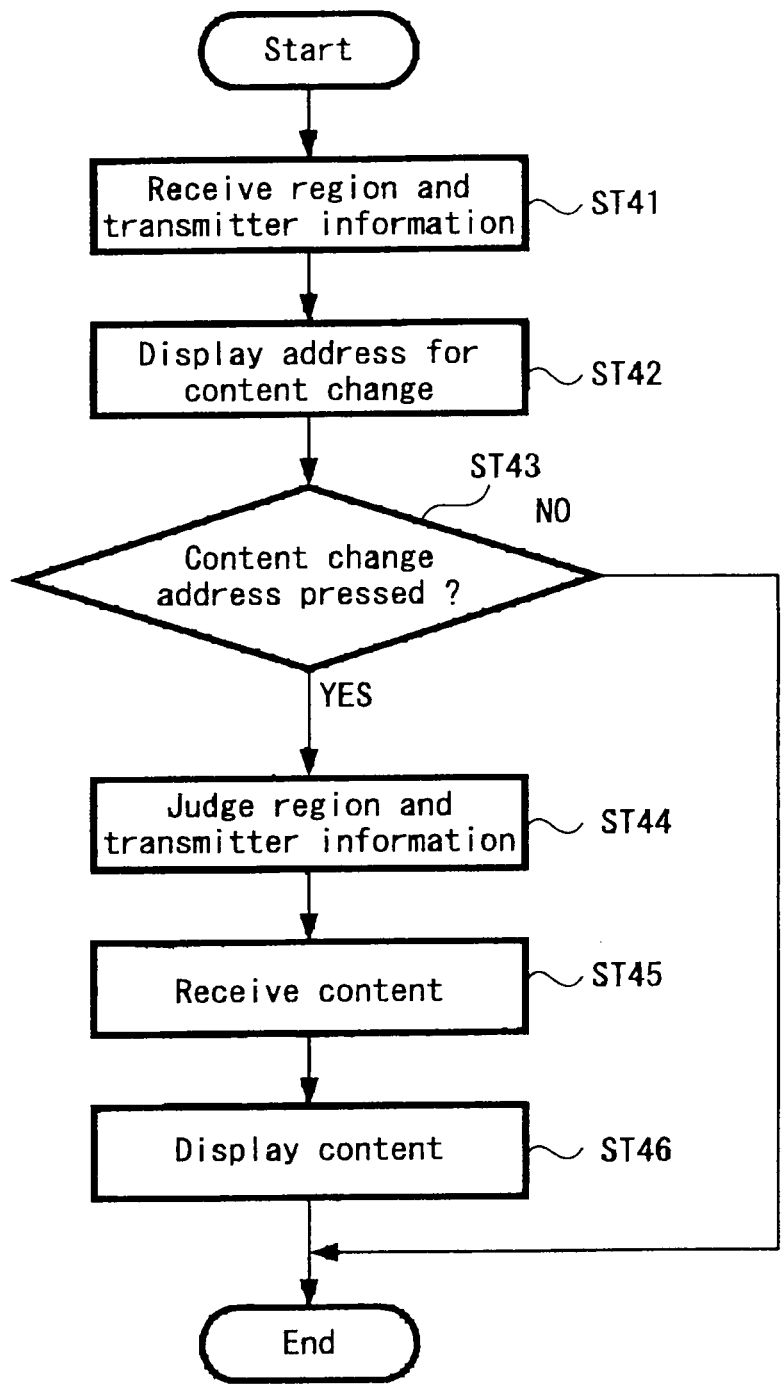
FIG. 3 is a flowchart showing an example of content conversion processing according to an embodiment of the invention.

FIG. 3 is a flowchart showing an example of processing when an application to process e-mail and an application to receive TV broadcasts are started simultaneously. Processing is explained according to the flowchart of FIG. 3 as follows. First, when e-mail is received in processing by the application to receive e-mail, it is supposed that link data to a specific program is received (step ST41). As the link data, for example, the station transmitting the program or other transmitter information, and information on the region of the broadcast is included. The transmitter information includes the station, as well as data on the system to which the station belongs.

FIG. 5 shows an example of the configuration of broadcast program link data. The link data is written in, for example, HTML (Hyper Text Markup Language) or another markup language, and includes a place d1 to describe the program name, a place d2 to describe the assumed broadcast region, broadcast network information d3, and a place d4 to describe the address at which the program is broadcast (that is, data specifying the receiving station). In the description example of FIG. 5, the explanation of the link data has been simplified, and the configuration differs from the actual configuration.

Returning to the explanation of the flowchart in FIG. 3, suppose that such link data was received, and the mail text containing the link data (content address before modification) was displayed (step ST42). At this time, for example, the program name is displayed as mail text. Then the CPU 17 judges whether there has been a user operation to select the displayed program name (step ST43). If there has been no such user operation, the application to receive TV broadcasts does not set (change) the reception channel, and processing ends.

If in step ST43 there has been such a user operation, the CPU 17 causes the reception channel of the tuner 16 to be set (changed) so as to receive the station contained in the link data (step ST44). As the processing to set the reception channel, a judgment is made as to whether the station is contained in a list of receivable stations indicated by the EPG data received at the time, and if contained in the list, the station is selected such that the channel for the relevant station is received. If on the other hand, the station is not contained in the list, a judgment is made as to whether there is a station with a system matching the system data of the station contained in the link data, and if there is a matching station, the station with the matching system is received.

Images of the broadcast program (content) of the station received in step ST44 are then displayed in the first display area 23 of the display portion 2, while audio is output from the speaker 1 (step ST45).

Figure 6A:
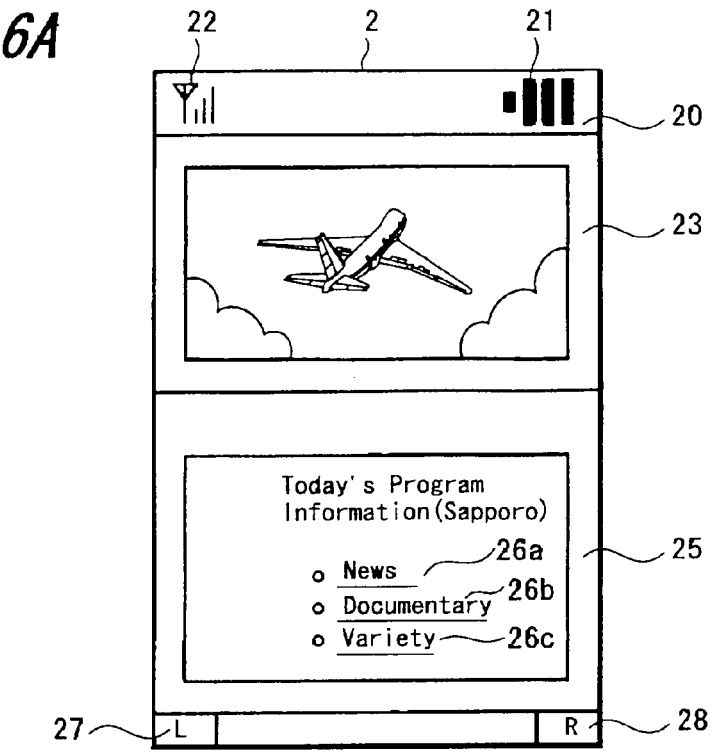
FIGS. 6A and 6B are explanatory drawing showing an example of screen transition of a mobile phone unit according to an embodiment of the invention.
Figure 6B:
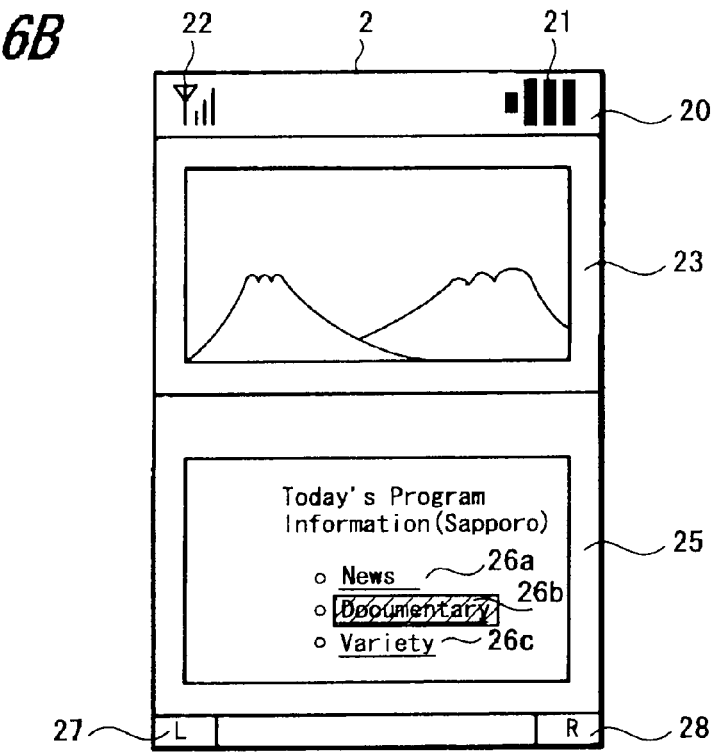

Here a specific example of operation is considered, and an example of a screen transition due to content switching of the mobile phone unit 100 is explained, referring to FIGS. 6A and 6B. FIG. 6A is an example of the display on the screen before the transition; FIG. 6B is an example of the screen display after switching.

In the example of FIGS. 6A and 6B, one of the applications among the two applications started simultaneously is a digital TV viewing application, and as indicated in FIG. 6A, images from a digital TV broadcast program are displayed, as the content display obtained from the application processing, in the first display area 23 of the display portion 2. The other application is a mailer, and as indicated in FIG. 6A, received e-mail text is displayed as the content display in the second display area 25 of the display portion 2. The e-mail displays, for example, the title of "Today's program information (Sapporo)" and titles of a TV program 26a (news) of XXX TV, a TV program 26b (documentary) of YYY TV, and a TV program 26c (variety) of ZZZ TV. FIG. 6A is an example in which the station names are not displayed; but these may be displayed together with the program titles. Here, when a program title is selected and confirmed among the TV programs 26a to 26c, the channel on which the desired program is broadcast is selected, and a link is set so as to display the TV program of the channel in the first display area 23.

In this state, when, for example, the user performs an operation to select the title of TV program 26b among the TV programs 26a to 26c displayed in the second display area 25, the title of TV program 26b (documentary) highlighted is displayed, as shown in FIG. 6B, and received images of the channel (the channel of YYY TV) on which the TV program 26b is broadcast are displayed in the first display area 23. If the time frame is that for display of the TV program 26b, the relevant documentary program is displayed.

However, direct selection of the channel of the station specified by such link data is possible when the broadcast region of the program indicated by the e-mail matches the current region of the mobile phone unit 100. For example, suppose that the broadcast region of the program indicated by the e-mail is Sapporo, and the current region of the unit 100 is Tokyo. At this time, a TV channel table 101 has been formed based on the EPG data received by the mobile phone unit 100; and by performing the reception channel modification processing previously explained in the flowchart of FIG. 3, so as to receive a station for which station data contained in this TV channel table 101 matches station data indicated by the link data for the selected TV program 26b, any region can be accommodated.

Thus, there is the advantageous result that, even when the TV channel of the station described in e-mail differs from the TV channels of stations in the region of the user, a channel broadcasting the program recommended by the e-mail can be viewed, without awareness of differences in region. In the example up to this point, an example has been explained of using link data for switching processing of the TV broadcast channel; however, a hard disk drive device or mass-storage memory may, for example, be incorporated in the mobile phone unit, in a configuration enabling recording of broadcast programs by the unit itself, and based on the program data, the reception channel when reserving recording of the broadcast program may be performed by similar processing, with channel changed as necessary based on link data.

In the above-described embodiment, an example was explained in which one of the applications was an application for TV viewing, and the other application was a mailer; however, other applications are possible, and connection to an objective TV program from a TV program address described on a web site or the like is possible. For example, in processing by an application for connection to the Internet, a web site displaying a TV program table is accessed, the TV program table is displayed, and when a program or channel is selected from the program table, the mobile phone unit may change the reception channel according to the region in which the mobile phone unit is located.

In the above-described embodiment, judgment of whether a region to which data having regional properties belongs matches the region of the unit was performed based on EPG data received together with broadcast data; but this judgment may be made using data other than EPG data. For example, a function to measure the position of the mobile phone unit may be employed. Even when EPG data is used, EPG data downloaded from the Internet or otherwise acquired by means other than a broadcast may also be used.

In the above-described embodiment, an example of using a mobile phone unit was explained; but the invention is not limited thereto, and other portable terminal devices may be used. For example, a PDA (Personal Digital Assistant) equipped with a TV tuner and mail receiver functions may be used as the portable information terminal, and similar processing is performed.

In the above-described embodiment, an example was explained of an application for viewing TV broadcast programs as an application acquiring content with regional properties; but application to other applications which acquire content with regional properties is possible. For example, a receiver portion to receive radio broadcasts may be incorporated into the terminal, and when another application is used to obtain link data to specify a radio broadcast program, the reception frequency may be changed according to the regions in which the radio station can be received.

It should be understood by those skilled in the art that various modifications, combinations, sub-combinations and alterations may occur depending on design requirements and other factors, insofar as they are within the scope of the appended claims or the equivalents thereof.

What is claimed is:

1. A portable terminal device, comprising:
   a memory;
   a microprocessor implementing:
      an application configured to receive a first data implementable only when the portable terminal device is in a particular location and configured to determine whether the first data is implementable only when the portable terminal device is in the particular location;
      a region determination unit configured to determine current location properties of the portable terminal device in response to the determination by the application that the first data is implementable only when the portable terminal device is in the particular location;
      a region comparison unit configured to compare the current location properties with properties of the particular location;
      a conversion unit configured to convert said first data based on predetermined table data in response to a determination by the region comparison unit that the current location properties do not match the properties of the particular location; and
      a second application configured to receive second data, wherein the predetermined table is generated based on the second data,
   wherein said first data includes at least one of an electronic program guide, a reception channel, or a reception frequency for the second application,
   wherein said conversion of said first data is further performed based on the received first data including at least one of an electronic program guide, a reception channel, or a reception frequency for the second application, and
   wherein the application is further configured to receive the first data via a wireless network connection.

2. The portable terminal device according to claim 1, wherein said first data includes a reception channel or reception frequency for the second application.

3. The portable terminal device according to claim 1, wherein the first data includes an electronic program guide.

4. The portable terminal device according to claim 1, wherein the application and second application operate simultaneously on the portable terminal.

5. A reception method executed using a portable terminal device having a microprocessor, the method comprising:
   receiving, via a wireless network connection, first data implementable only when the portable terminal device is in a particular location;
   determining, by an application, that the first data is implementable only when the portable terminal device is in the particular location;
   determining, using the microprocessor, current location properties of the portable terminal device in response to the determination by the application that the first data is implementable only when the portable terminal device is in the particular location;
   comparing, using the microprocessor, the current location properties with properties of the particular location;
   converting, using the microprocessor, said first data based on predetermined table data in response to a determination by the determining that the current location properties do not match the properties of the particular location; and
   receiving, via a second application, second data, wherein the predetermined table is generated based on the second data,
   wherein said first data includes at least one of an electronic program guide, a reception channel, or a reception frequency for the second application,
   wherein said converting of said first data is further performed based on the received first data including at least one of an electronic program guide, a reception channel, or a reception frequency for the second application.

6. The method according to claim 5, wherein said first data includes a reception channel or reception frequency for the second application.

7. The method according to claim 5, wherein the receiving first data in the application further comprises receiving the first data via a wireless network connection.

8. The method according to claim 5, wherein the first data includes an electronic program guide.

9. The method according to claim 5, wherein the application and second application operate simultaneously on the portable terminal.

10. A non-transitory computer readable storage medium having stored thereon a program executing a reception method comprising:
- receiving, via a wireless network connection, first data implementable only when the portable terminal device is in a particular location;
- determining, by an application, that the first data is implementable only when the portable terminal device is in the particular location;
- determining current location properties of the portable terminal device in response to the determination by the application that the first data is implementable only when the portable terminal device is in the particular location;
- comparing the current location properties with properties of the particular location; and
- converting said first data based on predetermined table data in response to a determination by the determining that the current location properties do not match the properties of the particular location; and
- receiving, via a second application, second data, wherein the predetermined table is generated based on the second data,
- wherein said first data includes at least one of an electronic program guide, a reception channel, or a reception frequency for the second application,
- wherein said converting of said first data is further performed based on the received first data including at least one of an electronic program guide, a reception channel, or a reception frequency for the second application.

11. The computer readable medium according to claim 10, wherein said first data includes a reception channel or reception frequency for the second application.

12. The computer readable medium according to claim 10, wherein the receiving first data in the application further comprises receiving the first data via a wireless network connection.

13. The computer readable medium according to claim 10, wherein the first data includes an electronic program guide.

* * * * *